US009815298B2

(12) United States Patent
Haramoto

(10) Patent No.: US 9,815,298 B2
(45) **Date of Patent: *Nov. 14, 2017**

(54) COLOR IMAGE PROCESSING DEVICE

(71) Applicants: TOPPAN PRINTING CO., LTD., Tokyo (JP); NISCA CORPORATION, Minamikoma-gun, Yamanashi (JP)

(72) Inventor: Rie Haramoto, Yamanashi (JP)

(73) Assignees: TOPPAN PRINTING CO., LTD, Tokyo (JP); CANON FINETECH NISCA INC., Misato-shi, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/782,507

(22) PCT Filed: Apr. 4, 2014

(86) PCT No.: PCT/JP2014/059952

§ 371 (c)(1),
(2) Date: Oct. 5, 2015

(87) PCT Pub. No.: WO2014/163181

PCT Pub. Date: Oct. 9, 2014

(65) Prior Publication Data

US 2016/0023474 A1 Jan. 28, 2016

(30) Foreign Application Priority Data

Apr. 5, 2013 (JP) ................................ 2013-079527

(51) Int. Cl.

| | |
|---|---|
| ***B41J 2/36*** | (2006.01) |
| ***H04N 1/415*** | (2006.01) |
| H04N 1/405 | (2006.01) |
| *H04N 1/417* | (2006.01) |

(52) U.S. Cl.

CPC .............. *B41J 2/36* (2013.01); *H04N 1/4055* (2013.01); *H04N 1/415* (2013.01); *H04N 1/417* (2013.01)

(58) Field of Classification Search

CPC ...... H04N 1/415; H04N 1/4055; H04N 1/417; H04N 1/4051; H04N 1/4105; H04N 1/6069; H04N 1/6016; B41J 2/36

See application file for complete search history.

(56) References Cited

U.S. PATENT DOCUMENTS

| | | | |
|---|---|---|---|
| 2007/0035773 | A1 | 2/2007 | Oki |
| 2011/0222125 | A1 | 9/2011 | Yasutomi et al. |

FOREIGN PATENT DOCUMENTS

| | | | |
|---|---|---|---|
| JP | S61-214662 | A | 9/1986 |
| JP | H01-249350 | A | 10/1989 |
| JP | H11-286132 | A | 10/1999 |

OTHER PUBLICATIONS

PCT, “International Search Report for International Application No. PCT/JP2014/059952”.

*Primary Examiner* — Henok Legesse
(74) *Attorney, Agent, or Firm* — Manabu Kanesaka

(57) ABSTRACT

A color image processing device uses a dither pattern of blocks, each including a plurality of dots representing the gradations of each pixel of an image in a prescribed region. The dither pattern includes a plurality of dot groups stacked, each dot group including dots arranged in a direction where a printing element moves relative to a recording medium, and the beginning of each group is set off by one or more dots in the movement direction, and a halftone image including the pixels is recorded, using variations in density, with the growth order going either from the first dot of the uppermost row of the dither pattern to the last dot of the lowermost row, or from the first dot of the lowermost row to the last dot of the uppermost row.

21 Claims, 11 Drawing Sheets

| | | Dots Connected to First Dot of Adjacent Block | | | | | | |
|---|---|---|---|---|---|---|---|---|
| | | Second dot (set off by 1 dot) | Third dot (set off by 2 dots) | Fourth dot (set off by 3 dots) | Fifth dot (set off by 4 dots) | Sixth dot (set off by 5 dots) | Seventh dot (set off by 6 dots) | Eighth dot (set off by 7 dots) |
| Number of Dots in Block | 4 | 128 | | | | | | |
| | 5 | 103 | | | | | | |
| | 6 | 86 | 128 | | | | | |
| | 7 | 74 | 110 | | | | | |
| | 8 | 64 | 96 | 128 | | | | |
| | 9 | 57 | 86 | 113 | 142 | | | |
| | 10 | 52 | 77 | 103 | 128 | | | |
| | 11 | 47 | 70 | 93 | 117 | 140 | | |
| | 12 | 43 | 64 | 86 | 107 | 128 | | |
| | 13 | 40 | 59 | 79 | 99 | 119 | 138 | 158 |
| | 14 | 37 | 55 | 73 | 91 | 110 | 128 | 146 |
| | 15 | 34 | 51 | 68 | 85 | 102 | 119 | 136 |
| | 16 | 32 | 48 | 64 | 80 | 96 | 112 | 128 |

↑ Gradation Value

FIG. 12A

| | | | | | | | | | | |
|---|---|---|---|---|---|---|---|---|---|---|
| 7 | 8 | 9 | 1 | 2 | 3 | 4 | 5 | 6 | 7 | 8 |
| 9 | 1 | 2 | 3 | 4 | 5 | 6 | 7 | 8 | 9 | |
| 2 | 3 | 4 | 5 | 6 | 7 | 8 | 9 | | | |
| 4 | 5 | 6 | 7 | 8 | 9 | | | | | |
| 6 | 7 | 8 | 9 | | | | | | | |

FIG. 12B

| | | | | | | |
|---|---|---|---|---|---|---|
| | 1 | 2 | 3 | 4 | 5 | 6 |
| 1 | 2 | 3 | 4 | 5 | 6 | 7 |
| 2 | 3 | 4 | 5 | 6 | 7 | 8 |
| 3 | 4 | 5 | 6 | 7 | 8 | 9 |
| 4 | 5 | 6 | 7 | 8 | 9 | 1 |

FIG. 12C

| | | | | | | | |
|---|---|---|---|---|---|---|---|
| 9 | 1 | 2 | 3 | 4 | 5 | 6 | 7 |
| 1 | 2 | 3 | 4 | 5 | 6 | 7 | 8 |
| 2 | 3 | 4 | 5 | 6 | 7 | 8 | 9 |
| 3 | 4 | 5 | 6 | 7 | 8 | 9 | 1 |
| 4 | 5 | 6 | 7 | 8 | 9 | 1 | 2 |

FIG. 12D

| | | | | | | | | |
|---|---|---|---|---|---|---|---|---|
| 9 | 1 | 2 | 3 | 4 | 5 | 6 | 7 | 8 |
| 1 | 2 | 3 | 4 | 5 | 6 | 7 | 8 | 9 |
| 2 | 3 | 4 | 5 | 6 | 7 | 8 | 9 | |
| 3 | 4 | 5 | 6 | 7 | 8 | 9 | | |
| 4 | 5 | 6 | 7 | 8 | 9 | | | |

FIG. 12E

| | | | | | | | | |
|---|---|---|---|---|---|---|---|---|
| | | | 1 | 2 | 3 | 4 | 5 | 6 |
| 1 | 2 | 3 | 4 | 5 | 6 | 7 | 8 | 9 |
| 4 | 5 | 6 | 7 | 8 | 9 | 1 | 2 | 3 |
| | | | 1 | 2 | 3 | 4 | 5 | 6 |

FIG. 12F

| | | | | | | | | |
|---|---|---|---|---|---|---|---|---|
| 7 | 8 | 9 | 1 | 2 | 3 | 4 | 5 | 6 |
| 1 | 2 | 3 | 4 | 5 | 6 | 7 | 8 | 9 |
| 4 | 5 | 6 | 7 | 8 | 9 | 1 | 2 | 3 |
| 7 | 8 | 9 | 1 | 2 | 3 | 4 | 5 | 6 |

COLOR IMAGE PROCESSING DEVICE

RELATED APPLICATIONS

The present application is National Phase of International Application No. PCT/JP2014/059952 filed Apr. 4, 2014, and claims priority from Japanese Application No. 2013-079527, filed Apr. 5, 2013, the disclosure of which is hereby incorporated by reference herein in its entirety.

TECHNICAL FIELD

The present invention relates to a color image processing device for use in printing apparatuses such as the thermal transfer printer, more particularly to a color image processing device for generating halftone images.

BACKGROUND ART

A halftone image (multi-level image) having intermediate gradation is formed by performing multi-gradation recording with changing the dot ratio of each pixel. To form the halftone image by changing the number of dot data items, dither methods are widely used. Of various dither methods, the halftone type that forms dots is commonly utilized.

A dither method that forms a line-based image is known. In this method, a plurality of dots are formed for one pixel data and combined, forming a dot set extending diagonal to the recording direction, and the density is increased, thereby forming more dots. (Refer to, for example, Patent Document 1)

A color image processing device is known. (Refer to, for example, Patent Document 2) In this device, multi-level writing is performed for each dot by supplying electric current selectively to a plurality of heating elements of the thermal head, changing the diameter of resin-based ink dots and transferring the ink dots to the paper, and a multi-color image is thereby recorded.

PRIOR-ART DOCUMENTS

Patent Documents

Patent Document 1: JP 61-214662A
Patent Document 2: JP 11-286132A

SUMMARY OF THE INVENTION

Technical Problem to be Solved by the Invention

The prior-art technique described in Patent Document 2 will be further explained with reference to FIG. 14. The dither pattern 110 is formed by gradually growing dots in the sub-scanning direction of the thermal transfer head, which is indicated by the arrow. In the case of cyan, each block 111 constituting one pixel is composed of 10 dots, i.e., nine (3×3) dots and one dot added to the upper part.

In the figure, the number affixed to each dot indicates the order in which the dot grows. Each dot can be printed in 15-gradation levels by controlling, in 15 levels, the time of supplying an electric current to the thermal transfer head. Hence, one pixel can be recorded in 151 gradations (i.e., (10×15)+1). Pixels of this dither pattern 110 are continuously recorded, whereby the image is recorded in a right-down direction at an angle of −18.4° with respect to the sub-scanning direction.

In the dither pattern 110 disclosed in Patent Document 2, however, the dots first grow respectively in the two blocks 111 adjacent in the sub-scanning direction are greatly spaced apart from each other. Of these blocks, the first block is connected to the second block when the fourth dot grows and becomes continuous to the third dot of the next block 111. Hence, until the next block 111 is grown to the third dot, the first block may not be continuous to the next block 111 even if it has grown to the fourth dot.

Therefore, in the prior art any block is not connected to the adjacent block 111 until it grows to have at least four dots (or until at least 61 output gradations are acquired). Therefore, the ink is inevitably isolated in a low-gradation printing using less than 61 gradations. Consequently, the ink may be faint or may form pitch blotches in the low-gradation printing when the sheet is released from the thermal transfer head or receives external influence such as temperature.

Accordingly, an object of the present invention is to provide a color image processing device that uses a dither pattern in which any adjacent blocks are connected even in low-gradation printing, thereby forming a high-quality color image.

Means for Solving the Problem

To achieve the object mentioned above, a color image processing device according to this invention uses a dither pattern of blocks each composed of a plurality of dots representing the gradations each pixel of an image in a prescribed region has. The dither pattern is composed of a plurality of dot groups stacked, each dot group composed of dots arranged in a movement direction where a printing element moves relative to a recording medium, and the beginning of each group is set off by one or more dots in the movement direction. A halftone image comprising the pixels is recorded, using variations in density, with the growth order going either from the first dot of the uppermost row of the dither pattern to the last dot of the lowermost row, or from the first dot of the lowermost row to the last dot of the uppermost row. In the dither pattern, the first dot of each row should better be set off from either the upper or lower row, thereby forming a step pattern.

The number of dots is a multiple of 3, preferably 9. If the number of dots is 9, the dots are divided, in the order of growth, into three groups or rows, the first group composed of dots 1 to 3, the second group composed of dots 4 to 6 and the third group composed of dots 7 to 9, and the first dot of the lower row is set off by one dot from the first dot of the immediately upper row. Alternatively, the first dot of any row may be set off by tow dots.

Further, the dots may be divided, in the order of growth, into four groups or rows, the first group composed of dots 1 and 2, the second group composed of dots 3 and 4, the third group composed of dots 5 and 6 and the fourth group composed of dots 7 to 9. The first dot of any row may be set off by one dot from the first dot of the immediately upper row.

Moreover, the dots may be divided, in the order of growth, into two groups or rows, the first group composed of dots 1 to 4 and the second group composed of dots 5 to 9, and the first dot of the lower row may be set off by three dots from the first dot of the upper row. Alternatively, the first dot of any row may be set off by one dot.

Further, the dots may be divided, in the order of growth, into two groups or rows, the first group composed of dots 1 to 5 and the second group composed of dots 6 to 9. The first dot of the low row may be set off by two dots from the first dot of the upper row.

Still further, each dot group may be composed of 11 dots. If each dot group is composed of 11 dots, the dots are divided, in the order of growth, into four groups or rows, the first group composed of dots 1 to 3, the second group composed of dots 4 to 6, the third group composed of dots 7 to 9 and the fourth group composed of dots 10 and 11, and the first dot of the lower row is set off by one dot from the first dot of the immediately upper row. Alternatively, the first dot of any row may be set off by two dots from the first dot of the immediately upper row.

Moreover, each dot group may be composed of 13 dots. If each dot group is composed of 13 dots, the dots are divided, in the order of growth, into five groups or rows, the first group composed of dots 1 to 3, the second group composed of dots 4 to 6, the third group composed of dots 7 to 9, the fourth group composed of dots 10 to 12 and the fifth group composed of dot 13, and the first dot of the lower row is set off by two dots from the first dot of the immediately upper row.

If each dot group is composed of 13 dots, the dots are divided, in the order of growth, into four groups or rows, the first group composed of dots 1 to 3, the second group composed of dots 4 to 6, the third group composed of dots 7 to 9, and the fourth group composed of dots 10 to 13. The first dot of any row may be set off by one dot from the first dot of the immediately upper row.

If each dot group is composed of 13 dots, the dots are divided, in the order of growth, into three groups or rows, the first group composed of dots 1 to 4, the second group composed of dots 5 to 8 and the third group composed of dots 9 to 13. The first dot of any row may be set off by one dot from the first dot of the immediately upper row.

The color image processing device may be configured to form color images by using at least cyan, magenta and yellow, dither patterns are used in cyan and magenta printing. The dither patterns used in cyan and magenta printing, respectively, are reverse and symmetric to each other with respect to a line.

Advantages of the Invention

As described above, the dither pattern used in this invention has blocks, each constituting one pixel. Each block is composed of a plurality of dots arranged in the direction where a printing element moves relative to a recording medium, forming rows of dots. Any row is set off by one or more dots from the first dot of the adjacent block in the moving direction of the printing element. Therefore, the distance between the block and the first dot of the adjacent block can be shortened. Hence, even in the low-gradation printing, the ink is not faint or does not form pitch blotches, achieving stable printing.

BRIEF DESCRIPTION OF DRAWINGS

FIG. 11 is a diagram explaining a gradation value at which one block is connected to the first dot of the adjacent block by changing the number of dots, with reference to the number (4 to 16) of dots constituting a one-pixel block.

FIGS. 12A to 12F are diagrams explaining various dot arrangements of a dither pattern composed of nine dots.

MODE FOR CARRYING OUT THE INVENTION

A color image processing device according to this invention will be described in detail, as an appropriate embodiment of the invention. The color image processing device, or the embodiment of the invention, will be explained as a thermal transfer printer configured to form color images by using three inks, e.g., cyan (C), magenta (M) and yellow (Y).

Figure 1:
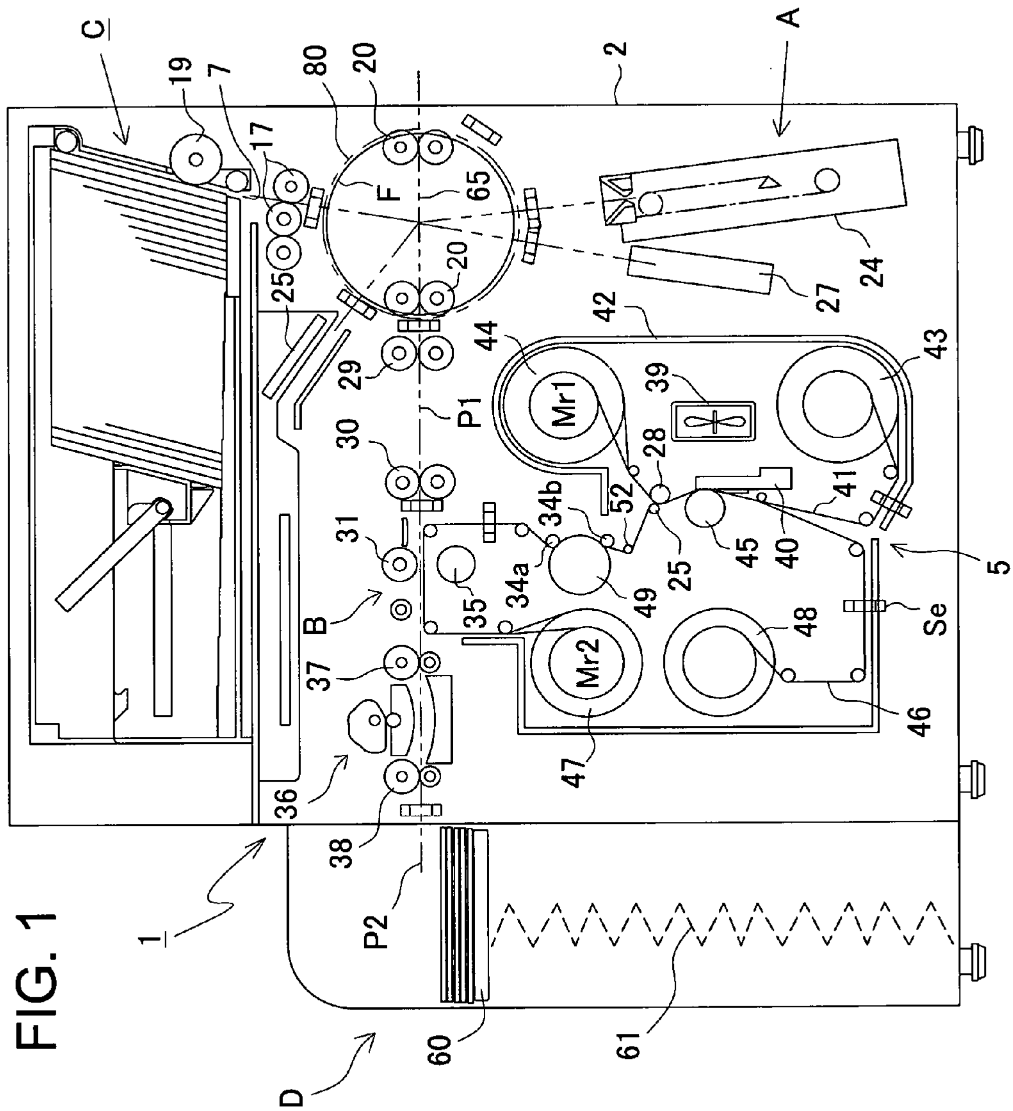
FIG. 1 is a sectional side view showing a schematic configuration of a card issuing apparatus that comprises a thermal transfer printer using a color image forming device according to this invention.

FIG. 1 is a sectional side view showing a schematic configuration of a card issuing apparatus 1 comprising a thermal transfer printer 5. The card issuing apparatus 1 is configured to record information on cards such as IC cards for use to identify persons and credit cards for use in commercial transaction. The housing 2 of the apparatus 1 incorporates an information recording unit A, an image forming unit B, a medium storing unit C, and a storage unit D.

The information recording unit A is composed of a magnetic recording unit 24, a non-contact IC recording unit 25, and a contact IC recording unit 27.

The medium storing unit C stores a plurality of cards aligned in standing position. The unit C has a feeding port 7 in its distal end. A pickup roller 19 may feed the cards from the unit C, the most front card at first.

Any card fed is first transported by feed rollers 17 to a reversing unit F. The reversing unit F is composed of a rotary frame 80 supported by bearings to rotate in the housing 2, and two pair of rollers 20 supported by the frame 80. The rollers 20 are supported by the frame 80 and can rotate around their axes.

Around the reversing unit F that may rotate, the magnetic recording unit 24, the non-contact IC recording unit 25, and the contact IC recording unit 27 are arranged. The pair of rollers 20 define a medium transport path 65 through which to transport each card to the recording unit 24, 25 or 27 in accordance with the type of the card. These recording units magnetically or electrically write data on the card.

The image forming unit B is configured to form an image such as a portrait or character data on the card. In the image forming unit B, a medium transport path P1 is provided to transport cards, extending from the medium transport path 65. At the medium transport path P1, transport rollers 29 and 30 are arranged to transport cards, and connected to a transport motor (not shown).

The image forming unit B comprises a medium transporting device shaped like film, and further comprises a primary transfer unit and a secondary transfer unit. In the primary transfer unit, the thermal head 40 prints an image on a transfer film 46 transported by the medium transporting device. Then, in the secondary transfer unit, the image is transferred from the transfer film 46 to the surface of the card existing in the medium transport path P1 and is printed by means of a heat roller 35. In the secondary transfer unit, the image is transferred as the heat roller 35 and a platen controller 31 clamp the transfer film 46 together with the card. The thermal head 40 has a plurality of heating elements arranged in the main scanning direction, and may print data as the transfer film 46, i.e., printing medium, moves in the sub-scanning direction with respect to the thermal head 40.

At the downstream the image forming unit B, a medium transport path P2 is provided to transport the printed card to a storage stacker 60. At the medium transport path P2, transport rollers 37 and 38 are arranged to transport the card.

Between the transport roller 37 and the transport roller 38, a de-curling mechanism 36 is arranged. The de-curling mechanism 36 pushes the middle part of the card held between the transport rollers 37 and 38, straightening up the card curled as the heat roller 35 performed the thermal transfer.

The storage unit D is configured to store the cards sent by way of a lift mechanism 61 from the image forming unit B. The cards move down and are stored as shown in FIG. 1.

The image forming unit B described above constitutes a thermal transfer printer 5 in which the color image processing device according to this invention prints a color image on the transfer film 46. The thermal transfer printer 5 will be described in further detail.

The transfer film 46 is wound around the feed spool 47 and take-up spool 48 of a film cassette 50. Between the feed spool 47 and take-up spool 48 of the film cassette 50, the aforementioned film transport path P4 is provided. The feed spool 47 and the take-up spool 48 are coupled to a feed motor Mr2 and a take-up motor, respectively. Both motors are secured to the device frame and coupled to the spool shafts by coupling means, are stepping motors, and may rotate in the same direction by the same angle.

In the film transport path P4, a transport roller 49 and pinch rollers 34*a* and 34*b* are arranged. The transfer film 46 is transported on the film transport path P4 as the transport roller 49 is driven and the pinch rollers 34*a* and 34*b* contact it with pressure. Therefore, the transport roller 49 and the pinch rollers 34*a* and 34*b* constitute a means for transporting the transfer film 46. The transport roller 49 is coupled to a drive motor, and can drive the transfer film 46 at a constant speed. As the transfer film 46 is driven, a sensor Se detects the markers formed on the transfer film 46 at prescribed intervals. The transport roller 49 is configured to rotate an ink ribbon 41 and the transfer film 46 at the same speed in the counterclockwise direction specified in FIG. 1, in the process of forming an image on the transfer film 46.

The ink ribbon 41 is stored in a ribbon cassette 42. In the ribbon cassette 42, a feed spool 43 and a take-up spool 44, which constitute an ink ribbon feeding means, are incorporated in rotatable state. The take-up spool 44 is coupled to a wind motor Mr1. The film-like ink ribbon 41 is wrapped around, and extends between, the spools 43 and 44. The ink ribbon 41 is a sublime type ribbon composed of three bands having cyan, magenta and yellow ink panels, respectively. Each ink panel has a width that corresponds to the print width of the transfer film 46. The sensor Se detects the position of the ink ribbon 41 being transported as the take-up spool 44 is driven.

The ribbon cassette 42 is held in the housing 2 and can be removed therefrom in a direction perpendicular to the plane of FIG. 1. The ink ribbon 41 is inserted in the gap between an image forming platen (i.e., platen roller) 45 and the thermal head 40.

The transfer film 46 is fed from the feed spool 47 and transported to the image-transfer start position as the transport roller 49 rotates in the clockwise direction. The ink ribbon 41 is transported to the start position at the same time as the take-up spool 44 rotates anticlockwise. At this point of operation, the transfer film 46 and the ink ribbon 41 are transported in the opposite directions.

When the transfer film 46 and the ink ribbon 41 are aligned at the image-transfer start position, the image forming platen 45 is driven by a pushing mechanism (not shown) toward the thermal head 40. The image forming platen 45 then contacts the thermal head 40 with the transfer film 46 and ink ribbon 41 clamped between it and the thermal head 40.

A head control IC (not shown) is connected to the thermal head 40 and controls the heating of the thermal head 40. As will be specified later, the head control IC controls the heating of the thermal head 40 in accordance with the dither pattern generated for the color image processing device of the present invention.

In synchronism with the heating of the thermal head 40, the take-up spool 44 is driven, moving the ink ribbon 41 at a preset speed in the take-up direction. At this point, the transport roller 49 rotates in the anticlockwise direction. The transfer film 46 can therefore be transported by a distance equivalent to the print width of one card, in the same direction the ink ribbon 41 is transported. An image is thereby formed on this part.

When the image is transferred by using one ink panel, the transport roller 49 rotates again in the clockwise direction, pulling the transfer film 46 back to the image-transfer start position by a distance corresponding to the print width of the card. At this point, the next ink panel is aligned with the transfer film 46 at the image-transfer start position since the ink ribbon 41 is continuously fed in the take-up direction.

As this control of the image-transfer start position proceeds, the cyan, magenta and yellow ink panels are aligned, one after another, with the image-transfer start position of the transfer film 46. After the control of the image-transfer start position, the thermal head 40 and the image forming platen 45 repeat the thermal transfer, transferring image such as a portrait or character data to the transfer film 46 and ultimately printing the image on the front or back of a card. The transfer film 46 on which the image is so printed by the thermal transfer printer 5 is transported to the secondary transfer unit of the image forming unit B, in which the printed image is transferred to the surface of a card.

The color image processing device according to this invention, which is incorporated in the thermal transfer printer 5, will be described.

Figure 2:
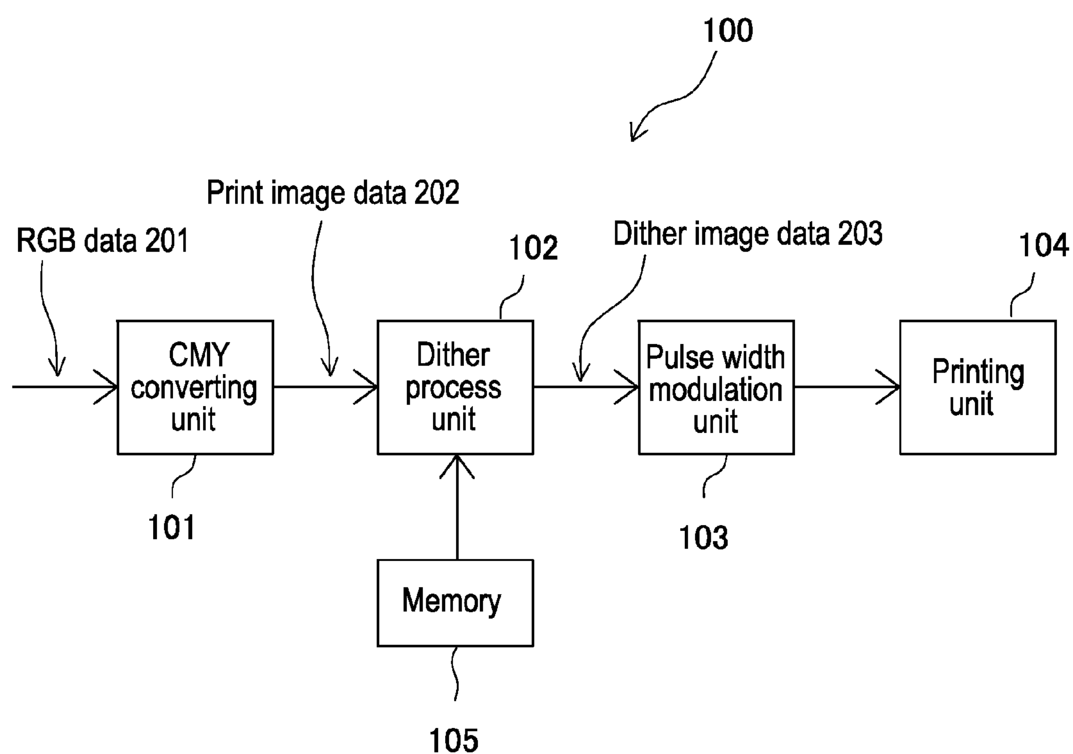
FIG. 2 is a block diagram explaining an embodiment of an image processing device, i.e., the color image forming device according to this invention.
Figure 3A:
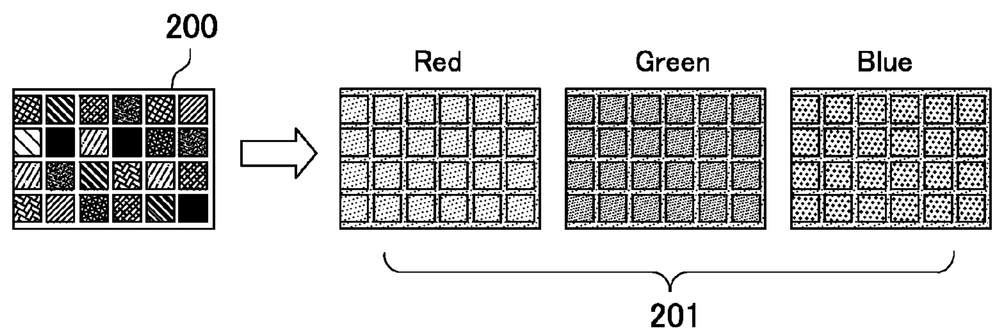
FIGS. 3A to 3C are diagrams schematically explaining how an image is processed in the color image forming device according to this invention.

FIG. 2 is a block diagram showing the configuration of the color image forming device 100 according to this invention, which is incorporated in the thermal transfer printer 5. The color image forming device 100 receives full-color input image data 200 (see FIG. 3A), together with a print instruction, from a higher device such as an external host computer. The color image forming device 100 then decomposes the input image data 200 and converts the same to RGB image data 201. FIG. 3A is a schematic representation of the image displayed on the basis of the input image data 200 and RGB image data 201.

Figure 3B:
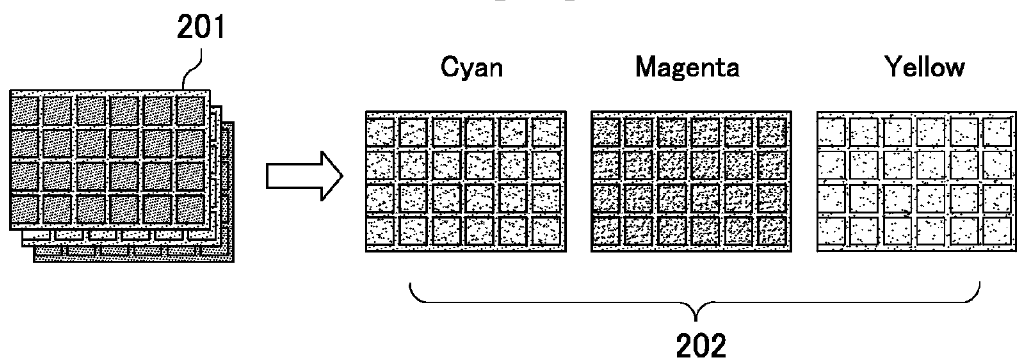
Figure 3C:
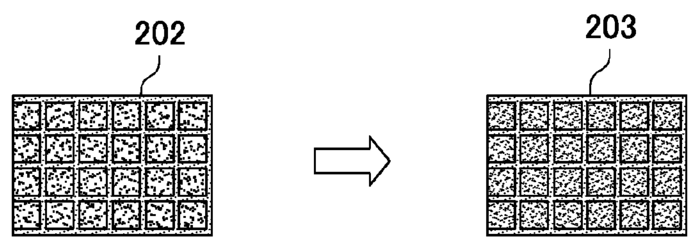

The CMY converting unit 101 performs a color matching process when the RGB image data 201 is input to it. The RGB image data is thereby converted to 256-gradation print image data 202 for each of the three colors, i.e., cyan, magenta and yellow. In this case, the cyan, magenta and yellow image data represent such images as schematically shown in FIG. 3B. The dither process unit 102 (i.e., dither processing means) generates dither image data 203 by performing halftone processing to each print image data 202 of cyan, magenta and yellow. FIG. 3C is a schematic representation of the image displayed on the basis of the cyan print image data 202.

This halftone process is performed by the dither conversion well known in the art. That is, the dither process unit 102 compares cyan, magenta and yellow image data 202 with the dither threshold values stored in a memory 105 and performs dither conversion on the image data, thereby determining a dither pattern. The dither threshold values used in this case are set, each for 3×3 dots of one pixel. The gradation of each dot is matched with the 256 gradations for the print image data 202. The dither process unit 102 generates dither image data 203 from the dither patterns determined for cyan, magenta and yellow. FIG. 3C shows the image represented by the dither image data 203 generated by performing the dither conversion on the cyan print image data 202.

Figure 4:
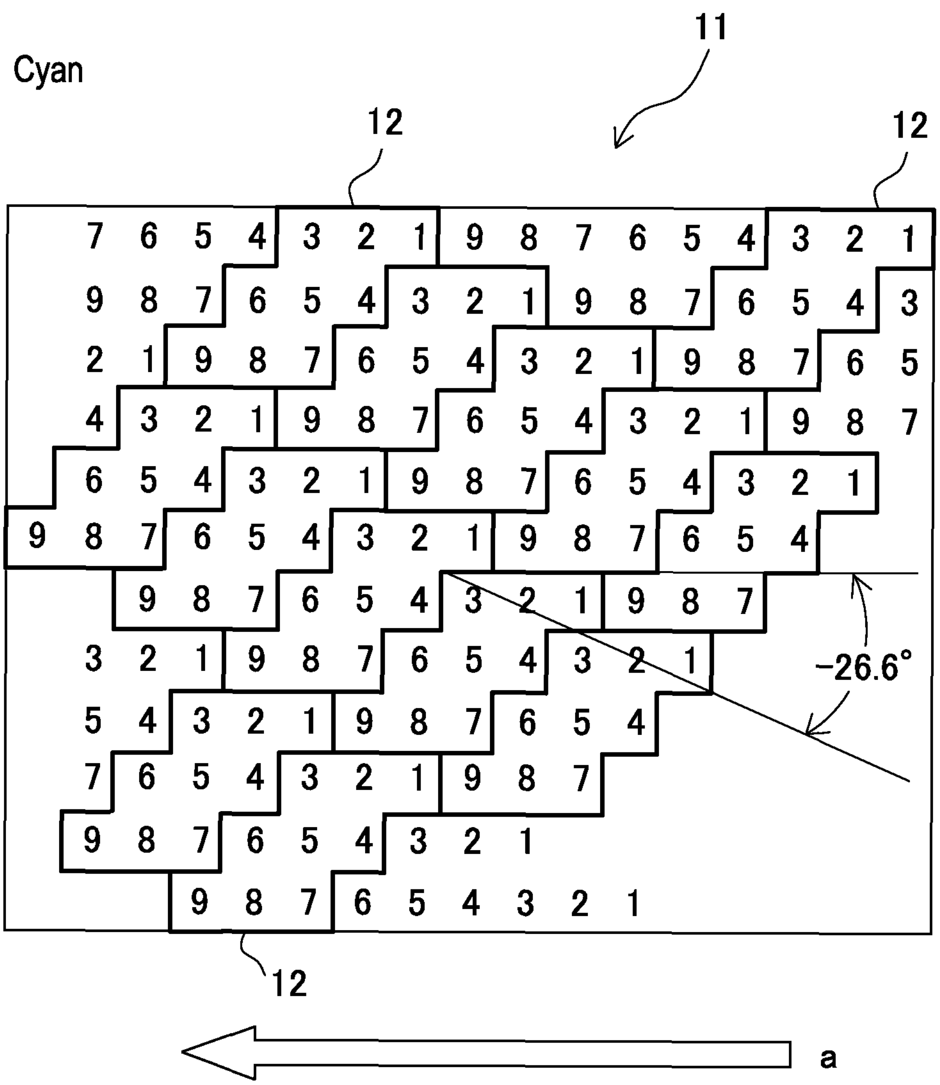
FIG. 4 is a diagram schematically explaining a cyan dither pattern.

FIG. 4 shows the cyan dither pattern 11 the dither process unit 102 has generated. In this pattern, 3×3 dots constitute one block, which is associated with one pixel of the print image data 202. Based on the comparison of the image data with the dither threshold values, at each block 12, the dither process unit 102 writes the print data to the number of dots that accord with the gradations for the pixels of the print image associated with the block. A dither pattern 11 is thereby generated. In this case, the numbers affixed to the respective dots indicate the distribution order (growth order) in which the dots are grown in the sub-scanning direction of the thermal head 40, or in the direction of the arrow a. So the dots to which print data is written are distributed in the growth order. Any dot represented by the print data is printed by the thermal head 40.

In the dither pattern 11, three dot rows, each composed of three dots arranged in the order they have been grown, are arranged one above another. The first dot of each row is set off from the first dot of either the upper or the lower row, forming a step pattern.

In the dither pattern 11 so constituted, any two adjacent blocks 12 grow such that the third dot of the first block is continuous to the first dot of the second block. Hence, the low-gradation printing is hardly influenced by external influence such as exfoliation and temperature, and can achieve high efficiency of transfer in the low-gradation printing. That is, the image is recorded on the transfer film 46 in 256 gradations, far more than 151 gradations in the aforementioned prior art example. Even if the output image is formed in a low-gradation scheme involving in about 85 gradations (three dots or more), any adjacent blocks will be connected, which enhances the thermal transfer efficiency in the low-gradation printing.

Since three dot rows, each composed of three dots, are set off from one another, the screen angle is −26.6° with respect to the sub-scanning direction of the thermal head 40. This large screen angle increases the distance between any two cyan blocks 12 adjacent in the sub-scanning direction of the thermal head 40, indicated by arrow a. The efficiency of transferring the images of the second and third colors, i.e., magenta and yellow, is therefore enhanced.

Figure 5:
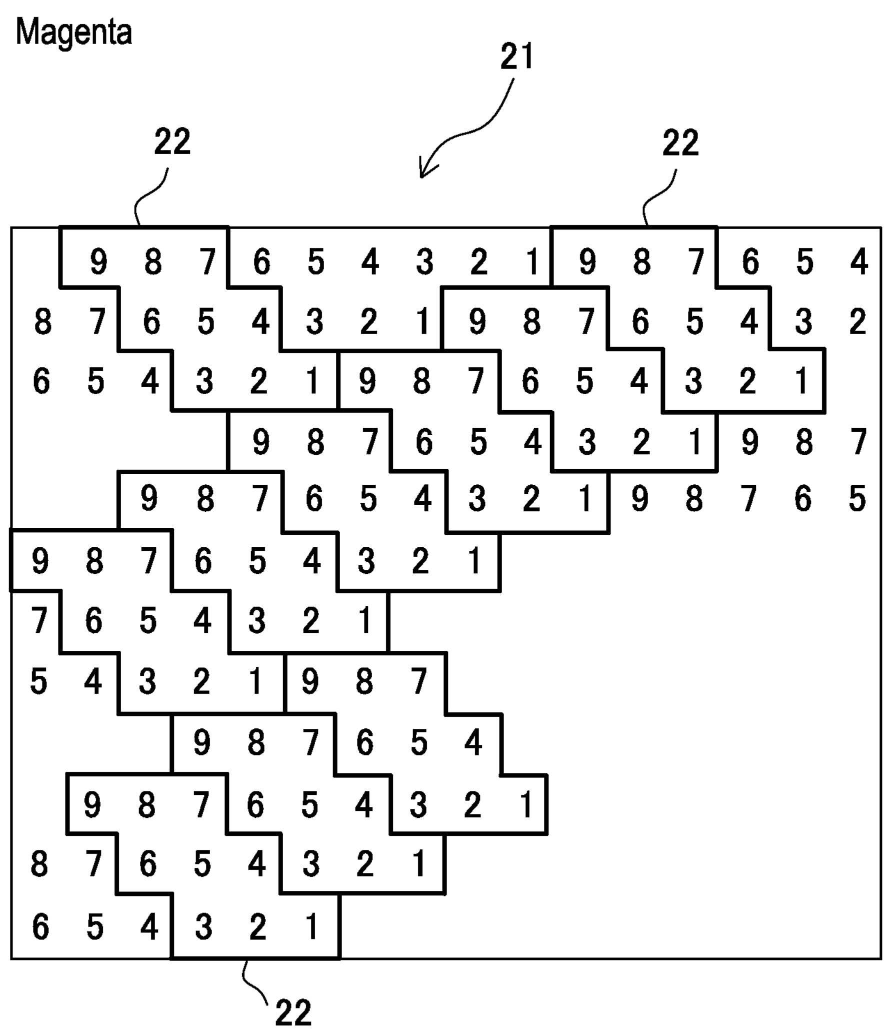
FIG. 5 is a diagram schematically explaining a magenta dither pattern.

FIG. 5 shows a magenta dither pattern 21. In the magenta dither pattern, each block is composed of nine dots as in the cyan dither pattern. Namely, three dot rows, each composed of three dots, are set off from one another. Hence, the same advantages can be achieved as in the cyan dither pattern.

In the magenta dither pattern 21, however, the step pattern is reverse and symmetric to that in the cyan dither pattern with respect to a line. Further, the dot rows are grown, first the lower row and finally the upper row, in the sub-scanning direction of the thermal head 40, namely in the opposite order. As a result, any cyan block intersects with one magenta block, thereby reducing the size of the moire pattern.

Figure 6:
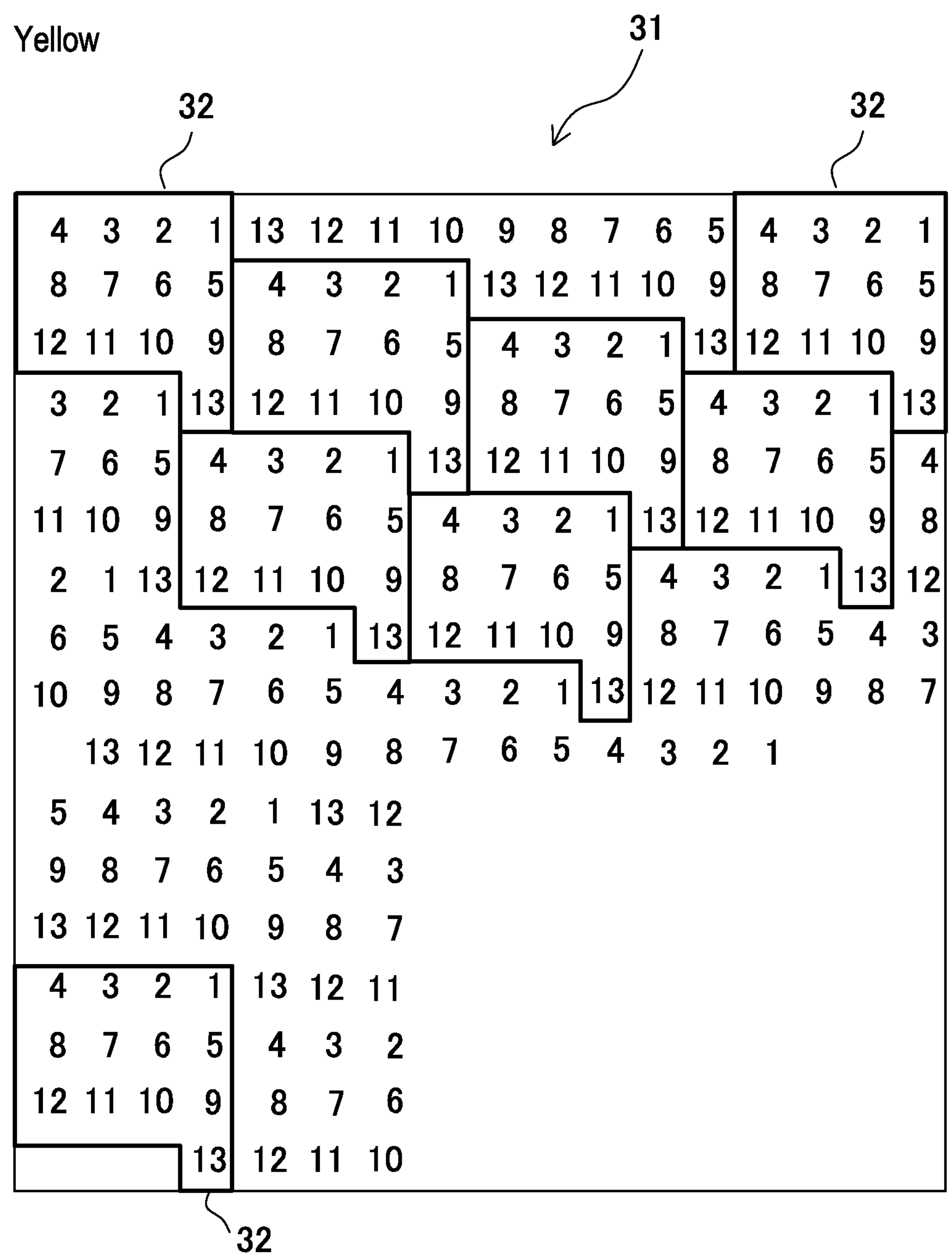
FIG. 6 is a diagram schematically explaining a yellow dither pattern.

FIG. 6 shows a yellow dither pattern 31. As shown in FIG. 6, each block 32 of the dither pattern 31 is composed of 12 dots (3 columns×4 rows), and one dot added below the first dot (ninth in the growth order) of the lowest row. Thus, the block 32 is composed of 13 dots. In this case, the first to twelfth dots grown sequentially are arranged in three columns and four rows in the sub-scanning direction of the thermal head 40, forming a 3×4 matrix.

Thus, each block 32 is composed of 13 dots, not 9 dots as in the cyan and magenta dither patterns. The screen angle is therefore 14°. This reduces the size of the moire pattern when the cyan, magenta and yellow images are printed one on another.

Referring back to FIG. 2, a pulse-width modulating unit 103 controls the time of supplying a current to the thermal head 40 of the printing unit 104 if the dither image data 203 based on the dither patterns 11, 21 and 31 for cyan, magenta and yellow is output. The amount in which to transfer the ink from the ink ribbon 41 to the transfer film 46 is thereby adjusted, whereby a halftone color image is printed. The printing unit 104 is not limited to a thermal transfer printer. The printing unit 104 may be a printing engine of either the electronic photographing type or the ink-jet printing type.

As described above, the cyan dither pattern 11 and the magenta dither pattern 21 are composed of blocks 12, each. Each block is composed of 9 dots, i.e., a multiple of 3. Each dot row is set off from the upper or lower dot row. The dot rows can be set off from one another, in various other arrangements. Some modifications will be explained below.

Figure 7:
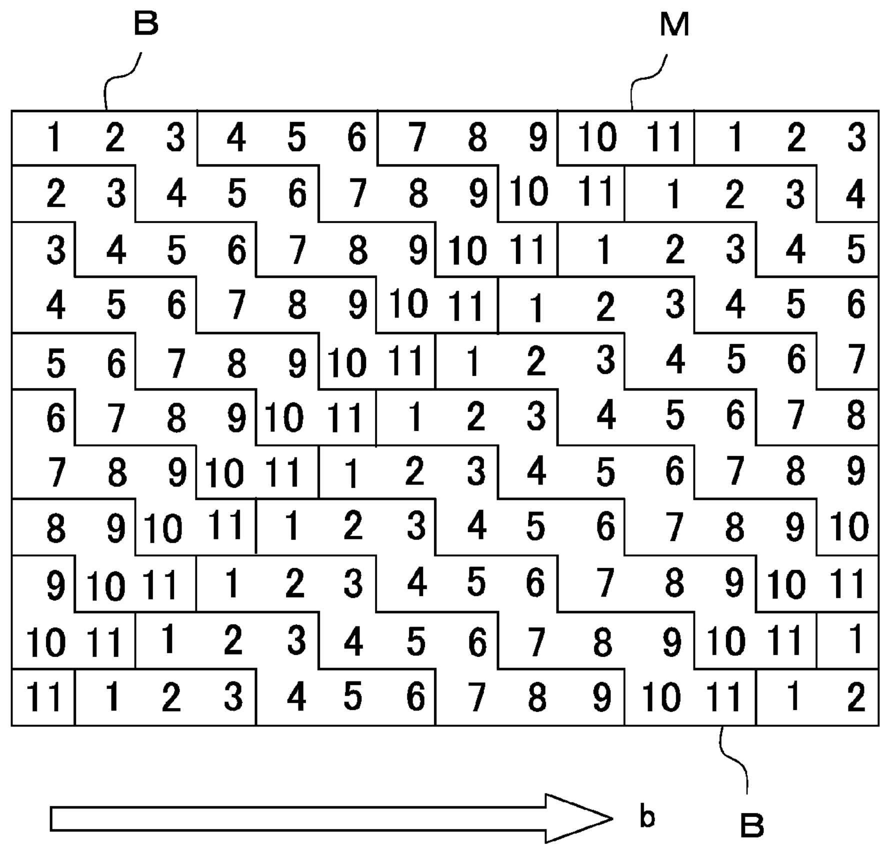
FIG. 7 is a diagram schematically showing a dither pattern in which 11 dots constitute a block.

FIG. 7 shows a dither pattern M in which 11 dots constitute one block B. The dots constituting one pixel are recorded, each in about 23 gradations. In FIG. 7, arrow b indicates the sub-scanning direction of the thermal head 40. In this direction, each dot grows. In the modifications of FIGS. 8 to 10 and 12, too, the thermal head 40 has this sub-scanning direction (arrow b).

In the dither pattern M of FIG. 7, the first group of dots 1 to 3 (the number indicates the order each dot has been grown) is arranged uppermost. The second group of dots 4 to 6 is arranged below the first group, with the first dot 4 set off by one dot in the row direction from the first dot 1 of the block B. The third group of dots 7 to 9 is arranged below the second group, with the first dot 7 set off from the dot 4 by one dot in the row direction. Further, the last two dots 10 and 11 are arranged lowermost, with the dot 10 set off from the dot 7 by one dot in the row direction. In the dither pattern M of FIG. 7, the second dot (about 47 gradations) et seq. of any group are connected to the first dot of the adjacent block B.

In this 11-dot configuration (not shown), the first dot of each row may be set off by two dots from the first dot of the immediately upper row. Therefore, the third dot (about 70 gradations) et seq. are connected to the first dot of the adjacent block B.

Figure 8:
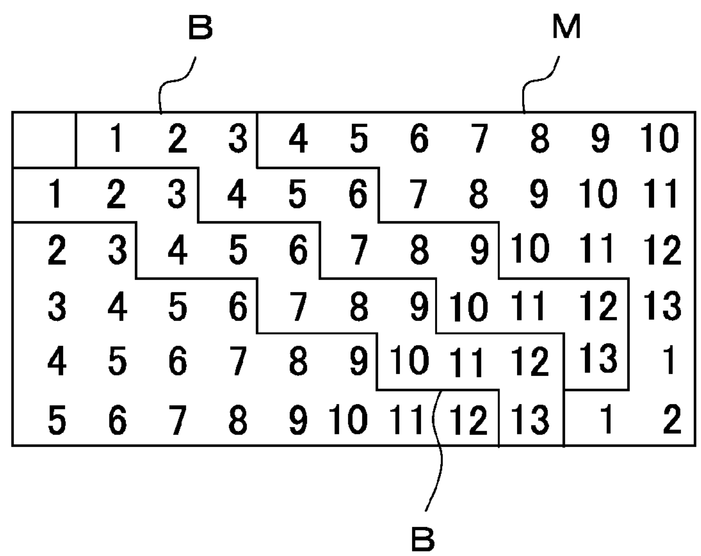
FIG. 8 is a diagram schematically showing a dither pattern in which 13 dots constitute a block.

In the dither pattern M of FIG. 8, each block B is composed of 13 dots. The dots 1 to 12 are divided into four rows or groups. The first group is composed of dots 1 to 3, the second group is composed of dots 4 to 6, the third group is composed of dots 7 to 9 and the fourth group is composed of dots 10 to 12 and 13. The first dot of any row is set off by two dots from the first dot of the immediately upper row. The second dot et seq. are connected to the first dot of the adjacent block.

Figure 9:
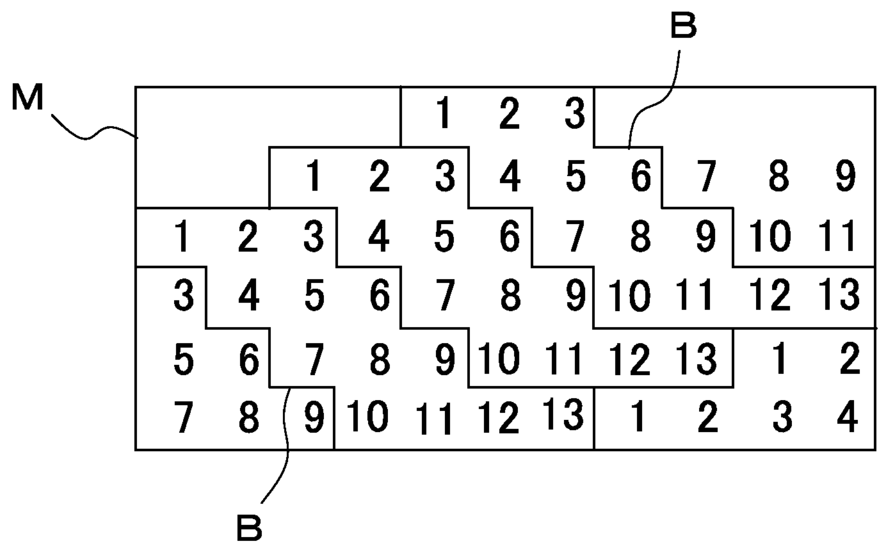
FIG. 9 is a diagram schematically showing a different dither pattern of another type, in which 13 dots constitute a block.

In the dither pattern M of FIG. 9, each block B is composed of 13 dots as in the dither pattern of FIG. 8. In the pattern of FIG. 9, however, the 13 dots are divided into groups or rows composed of dots 1 to 3, dots 4 to 6, dots 7 to 9 and dots 10 to 13, respectively. The first dot of each row is set off by one dot from the first dot of the immediately upper row. Further, the dots 10 to 13 constitute the lowest dot group, and the third dot et seq. are connected to the first dot of the adjacent block.

Figure 10:
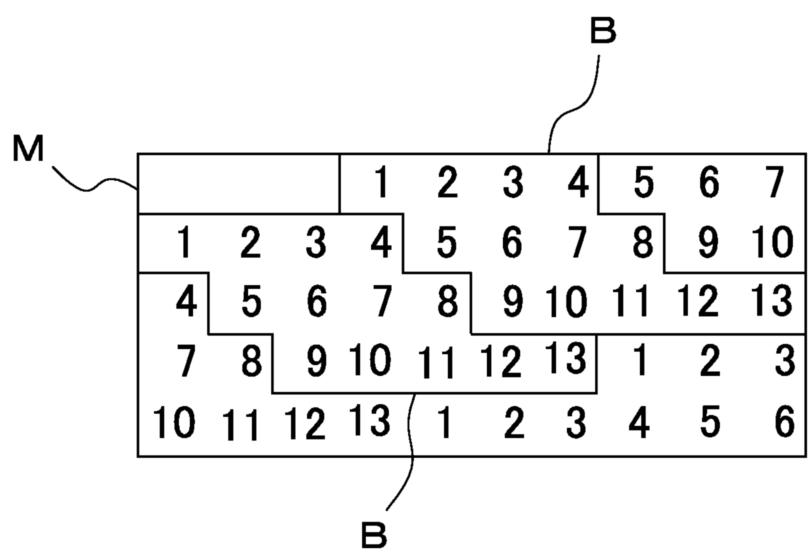
FIG. 10 is a diagram schematically showing another different dither pattern of still other type, in which 13 dots constitute a block.

Similarly, in the dither pattern M of FIG. 10, each block B is composed of 13 dots. These dots are divided into a group composed of 1 to 4, a group composed of dots 5 to 8, and a group composed of dots 9 to 13. The first dot of any row is set off by one dot from the first dot of the immediately upper row, and the fourth dot et seq. are connected to the first dot of the adjacent block.

Thus, the first dot of any row is set off by a few dots from the immediately upper row, and the dot connected to the first dot of the adjacent block is thereby determined. FIG. 11 is a diagram explaining a gradation value at which one block is connected to the first dot of the adjacent block in accordance with the number of dots set off, with reference to the number (4 to 16) of dots constituting a one-pixel block. In this case, the gradation value one dot records varies, depending on the number of dots constituting the block B. If one block is constituted by 9 dots as described above, each dot is recorded in about 28 gradations. If one block is constituted by 11 dots as described above, each dot is recorded in about 23 gradations.

FIGS. 12A to 12F are similar to FIGS. 4 and 5, showing various dither patterns, each composed of nine dots. In the dither pattern M of FIG. 12A, each block is divided into two dot groups or rows, one composed of dots 1 to 4, and the other composed of dots 5 to 9. The first dot of the second low is set off by two dots from the first dot of the upper row and the third dot of the upper row is connected to the first dot of the adjacent block.

In the dither pattern M of FIG. 12B, each block is divided into four dot groups or rows, i.e., first row composed of dots 1 and 2, second row composed of dots 3 and 4, third row composed of dots 5 and 6, and fourth row composed of dots 7, 8 and 9. The first dot of each row is set off by one dot from the first dot of the immediately upper row, whereby the second dot is connected to the first dot of the adjacent block.

In the dither pattern M of FIG. 12C, each block is divided into three dot groups or rows, the first row composed of dots 1 to 3, the second row composed of dots 4 to 6, and the third row composed of dots 7 to 9. The first dot of each row is set off by two dots from the first dot of the immediately upper row, whereby the second dot is connected to the first dot of the adjacent block.

In the dither pattern M of FIG. 12D, each block is divided into dot groups or rows, the first row composed of dots 1 to 4 and the second row composed of dots 5 to 9. The first dot of the lower row is set off by three dots from the first dot of the upper row, whereby the second dot et seq. are connected to the first dot of the adjacent block.

In the dither pattern M of FIG. 12E, each block is divided into dot groups or rows, the first row composed of dots 1 to 4 and the second row composed of dots 5 to 9. The first dot of the lower row is set off by one dot from the first dot of the upper row, whereby the second dot et seq. are connected to the first dot of the adjacent block.

In the dither pattern M of FIG. 12F, each block is divided into two dot groups or rows, the first row composed of dots 1 to 5, and the second row composed of dots 6 to 9. The first dot of the lower row is set off by two dot from the first dot of the upper row, whereby the fourth dot et seq. are connected to the first dot of the adjacent block.

Figure 13:
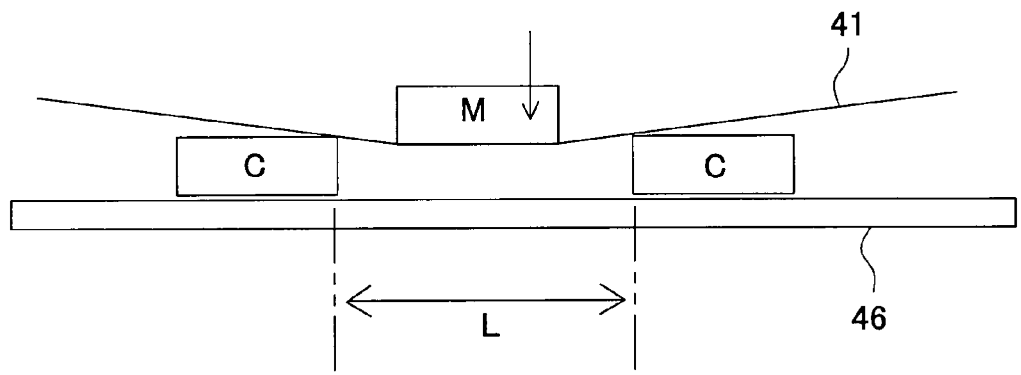
FIG. 13 is a diagram explaining the distance between a cyan dot and a magenta dot that are adjacent in the main scanning direction of a thermal head 40 when an ink ribbon is printed on a transfer film.
Figure 14:
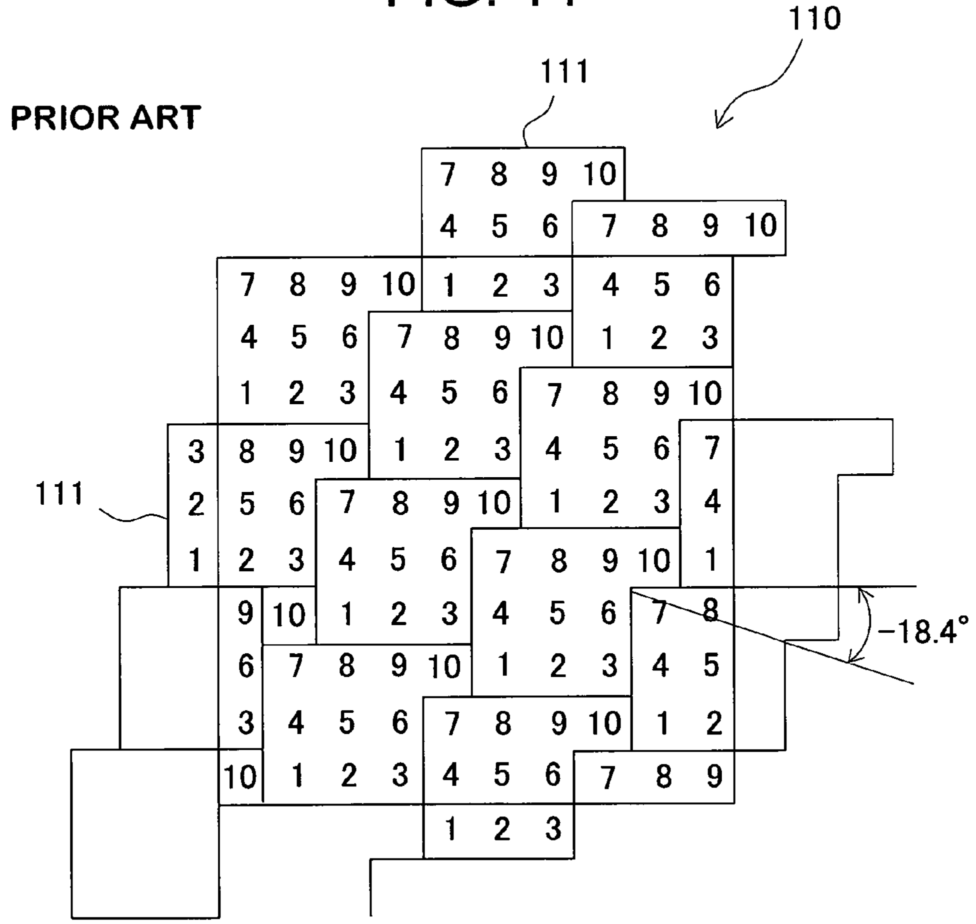
FIG. 14 is a schematic diagram explaining a dither pattern of the prior art.

As specified above, each pixel in any dither pattern is composed of various number of dots. If the pixel is composed of 12 dots or more, the gradations will increase in number, but the resolution will fall to lower the image resolution. If the pixel is composed of 6 dots or less, the distance L (FIG. 13) between the cyan and magenta, adjacent to each other in the main scanning direction of the thermal head 40, will become shorter, and the transfer ability of the second color et seq. will be lower than in the case where the pixel is composed of 9 dots. In view of this, the pixel composed of 9 dots is optimal in the dither pattern.

As has been described, in the dither pattern according to this invention, each block constituting one pixel is composed of a plurality of dot groups or rows. The dot rows are arranged one above another, and the first dot of any row is set off by one or more dots from the immediately upper of lower row. The dots of any row are sequentially grown in the sub-scanning direction of the thermal head 40. The distance between the first dot of any block and the first dot of the adjacent block is, therefore, shortened. As a result, by narrowing distance between adjacent blocks relating a first dot, any block is connected to the adjacent block at 85 gradations or more (i.e., three dots or more) in case of printing with 256 output gradations. Hence, when the image is transferred from the ink ribbon 41 to the transfer film 46, the ink is not faint or does not form pitch blotches even in the low-gradation printing.

INDUSTRIAL APPLICABILITY

This invention relates to a color image processing device that enhances the efficiency of printing cyan, magenta and yellow images one on another, even in low-gradation printing, when color image is formed. The invention therefore possesses industrial applicability.

EXPLANATION OF REFERENCE SYMBOLS

11 Dither pattern for cyan
12 Block
13 Dot
21 Dither pattern for magenta
31 Dither pattern for yellow
M Dither pattern

The invention claimed is:

1. A color image processing device which is connected to a printing unit having a plurality of heating elements arranged in a main scanning direction of a thermal head, and outputting dither image data, when forming an image on a recording medium moving in a sub-scanning direction in respect to the thermal head, to the printing unit forming the image using a dither pattern formed of blocks each being composed of a plurality of dots representing gradations of each pixel of the image in a prescribed region, comprising:

a dither process unit for performing a dither conversion to inputted image data to generate the dither image data; and an output unit connected to the dither process unit, for outputting the dither image data to the printing unit, wherein each block of the dither pattern is composed of a plurality of dot groups stacked in rows in the sub-scanning direction, and arranged in the main scanning direction, and a beginning of the dot group in each row is set off in respect to that of the dot group above or below the each row by one or more dots in the sub-scanning direction; and the dither process unit generates the dither image data representing density with a growth order being either from a first dot of an uppermost row of the dither pattern to a last dot of a lowermost row, or from a first dot of the lowermost row to a last dot of the uppermost row.

2. The color image processing device according to claim 1, wherein a first dot of each row is set off from either the upper or lower row, thereby forming a step pattern.

3. The color image processing device according to claim 2, wherein the number of dots is 11.

4. The color image processing device according to claim 3, wherein the dots are divided, in the order of growth, into four groups or rows, a first group composed of dots 1 to 3, a second group composed of dots 4 to 6, a third group composed of dots 7 to 9, a fourth group composed of dots 10 and 11, and the first dot of the lower row is set off by one dot from the first dot of the immediately upper row.

5. The color image processing device according to claim 3, wherein the dots are divided, in the order of growth, into four groups or rows, a first group composed of dots 1 to 3, a second group composed of dots 4 to 6, a third group composed of dots 7 to 9, and a fourth group composed of dots 10 and 11, and the first dot of the lower row is set off by two dots from the first dot of the immediately upper row.

6. The color image processing device according to claim 2, wherein the number of dots is 13.

7. The color image processing device according to claim 6, wherein the dots are divided, in the order of growth, into five groups or rows, a first group composed of dots 1 to 3, a second group composed of dots 4 to 6, a third group composed of dots 7 to 9, a fourth group composed of dots 10 to 12, and a fifth group composed of dot 13, and the first dot of the lower row is set off by two dots from the first dot of the immediately upper row.

8. The color image processing device according to claim 6, wherein the dots are divided, in the order of growth, into four groups or rows, a first group composed of dots 1 to 3, a second group composed of dots 4 to 6, a third group composed of dots 7 to 9, a fourth group composed of dots 10 to 13, and the first dot of any row is set off by one dot from the first dot of the immediately upper row.

9. The color image processing device according to claim 6, wherein the dots are divided, in the order of growth, into three groups or rows, a first group composed of dots 1 to 4, a second group composed of dots 5 to 8, and a third group composed of dots 9 to 13, and the first dot of any row is set off by one dot from the first dot of the immediately upper row.

10. The color image processing device according to claim 1, wherein the number of dots is a multiple of 3.

11. The color image processing device according to claim 10, wherein the number of dots is 9.

12. The color image processing device according to claim 11, wherein the dots are divided, in the order of growth, into three groups or rows, a first group composed of dots 1 to 3, a second group composed of dots 4 to 6, and a third group composed of dots 7 to 9, and the first dot of the lower row is set off by one dot from the first dot of the immediately upper row.

13. The color image processing device according to claim 11, wherein the dots are divided, in the order of growth, into two groups or rows, a first group composed of dots 1 to 4 and a second group composed of dots 5 to 9, and the first dot of the lower row is set off by two dots from the first dot of the upper row.

14. The color image processing device according to claim 11, wherein the dots are divided, in the order of growth, into four groups or rows, a first group composed of dots 1 and 2, a second group composed of dots 3 and 4, a third group composed of dots 5 and 6, and a fourth group composed of dots 7 to 9, and the first dot of any row is set off by one dot from the first dot of the immediately upper row.

15. The color image processing device according to claim 11, wherein the dots are divided, in the order of growth, into three groups or rows, a first group composed of dots 1 to 3, a second group composed of dots 4 to 6, and a third group composed of dots 7 to 9, and the first dot of any row is set off by two dots from the first dot of the immediately upper row.

16. The color image processing device according to claim 11, wherein the dots are divided, in the order of growth, into two groups or rows, a first group composed of dots 1 to 4 and a second group composed of dots 5 to 9, and the first dot of the lower row is set off by three dots from the first dot of the upper row.

17. The color image processing device according to claim 11, wherein the dots are divided, in the order of growth, into two groups or rows, a first group composed of dots 1 to 4 and the second group composed of dots 5 to 9, and the first dot of the low row is set off by one dot from the first dot of the upper row.

18. The color image processing device according to claim 11, wherein the dots are divided, in the order of growth, into two groups or rows, a first group composed of dots 1 to 5 and a second group composed of dots 6 to 9, and the first dot of the low row is set off by two dots from the first dot of the upper row.

19. The color image processing device according to claim 1, wherein color images are formed from at least cyan, magenta, and yellow, and the dither patterns are used in cyan and magenta printing.

20. The color image processing device according to claim 19, wherein the dither patterns used in cyan and magenta printing, respectively, are reverse and symmetric to each other with respect to a line.

21. A color image processing system, comprising:

a printing unit having a plurality of heating elements arranged in a main scanning direction of a thermal head forming an image on a recording medium moving in a sub-scanning direction in respect to the thermal head using a dither pattern formed of blocks each being composed of a plurality of dots representing gradations of each pixel of the image in a prescribed region, a dither process unit for performing a dither conversion to inputted image data to generate the dither image data; and an output unit connected to the dither process unit, for outputting the dither image data to the printing unit, wherein each block of the dither pattern is composed of a plurality of dot groups stacked in rows in the sub-scanning direction, and arranged in the main scanning direction, and a beginning of the dot group in each row is set off in respect to that of the dot group above or below the each row by one or more dots in the sub-scanning direction; and the dither process unit generates the dither image data representing density with a growth order being either from a first dot of an uppermost row of the dither pattern to a last dot of a lowermost row, or from a first dot of the lowermost row to a last dot of the uppermost row.

* * * * *